(12) United States Patent
Fross et al.

(10) Patent No.: US 6,394,131 B1
(45) Date of Patent: May 28, 2002

(54) TRAPPED FLUID VOLUME COMPENSATOR FOR HYDRAULIC COUPLERS

(75) Inventors: Robert D. Fross; Richard K. O. Barratt, both of Houston, TX (US)

(73) Assignee: ABB Offshore Systems, Inc., Houston, TX (US)

( * ) Notice: Subject to any disclaimer, the term of this patent is extended or adjusted under 35 U.S.C. 154(b) by 51 days.

(21) Appl. No.: 09/713,952

(22) Filed: Nov. 16, 2000

(51) Int. Cl.[7] ................................................. F16L 37/28
(52) U.S. Cl. .......................... 137/614.05; 137/614.04; 137/614; 137/81.5; 251/149.7
(58) Field of Search ..................... 137/614.04, 614.05, 137/81.2, 614; 251/149.6, 149.7

(56) References Cited

U.S. PATENT DOCUMENTS

| | | | |
|---|---|---|---|
| 4,294,284 A | * 10/1981 | Herd | 137/613 |
| 4,754,780 A | * 7/1988 | Smith, III | 137/614.04 |
| 4,777,800 A | * 10/1988 | Hay, II | 60/593 |
| 4,832,080 A | * 5/1989 | Smith, III | 137/614.04 |
| 4,858,648 A | * 8/1989 | Smith, III et al. | 137/614.04 |
| 5,099,882 A | 3/1992 | Smith, III | 137/614.04 |
| 5,203,374 A | 4/1993 | Smith, III | 137/614.04 |
| 5,277,225 A | * 1/1994 | Smith | 137/614.04 |
| 5,469,887 A | * 11/1995 | Smith, III | 137/614.04 |
| 5,884,706 A | 3/1999 | Edwards | 166/335 |
| 6,089,321 A | 7/2000 | Morrill | 166/341 |

* cited by examiner

Primary Examiner—A. Michael Chambers
(74) Attorney, Agent, or Firm—Bracewell & Patterson, L.L.P.

(57) ABSTRACT

A volume compensator has a body with an axial chamber containing a piston assembly that is biased to one side by a spring. The compensator is coaxially mounted with a female coupler to a protective cover for a hydraulic interface plate. The female coupler has an axial bore containing a poppet assembly with an axial bleed port that extends into a receptacle on the end of the female coupler. The receptacle receives a male coupler on the interface plate. The male coupler contains a poppet assembly with a solid poppet that seals in high pressure hydraulic fluid. When the cover is secured to the interface plate, the male coupler is inserted into the receptacle and a small amount of sea water is trapped in between. The trapped sea water is forced through the bleed port and female coupler, and into the compensator where it displaces the piston and spring in the compensator. When the tips of poppets engage, high pressure hydraulic fluid is released into the female coupler and compensator where it is retained. When the cover is detached from the interface plate, the tips of the poppets disengage to seal off the high pressure hydraulic fluid. As the male coupler is withdrawn from the receptacle, the spring returns the piston to its starting position and ambient sea water is drawn into the chamber in the compensator.

11 Claims, 3 Drawing Sheets

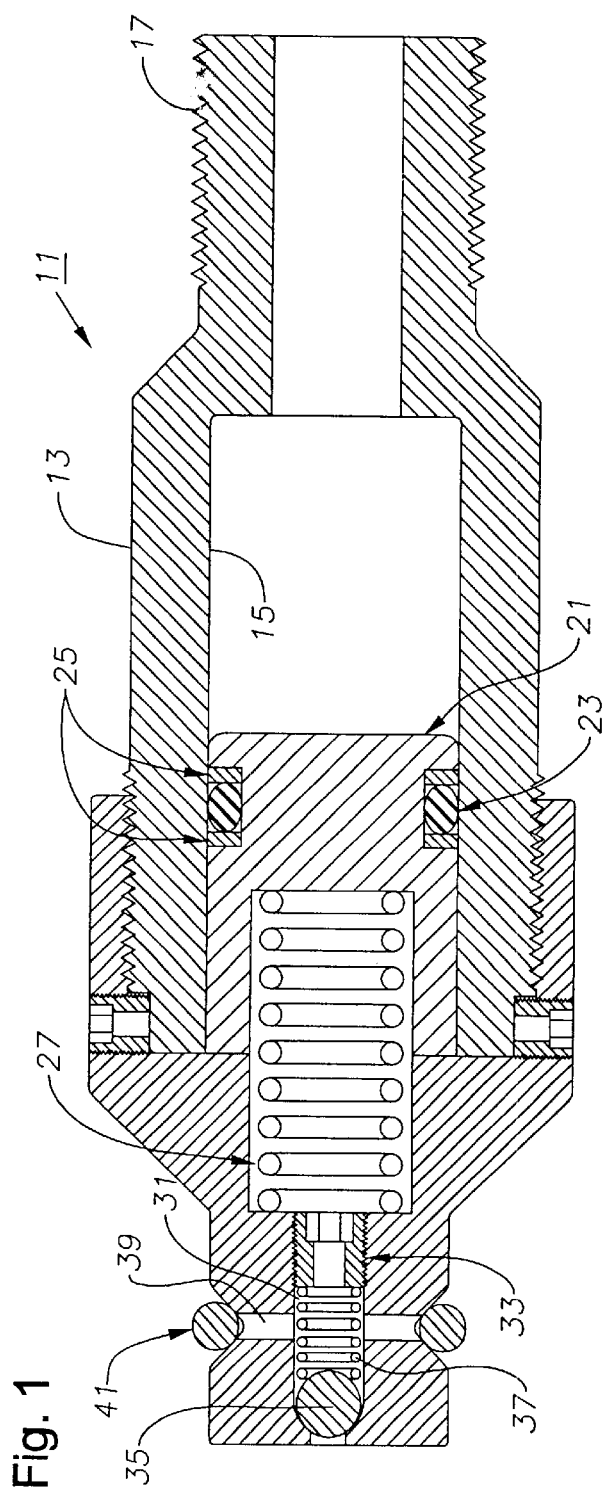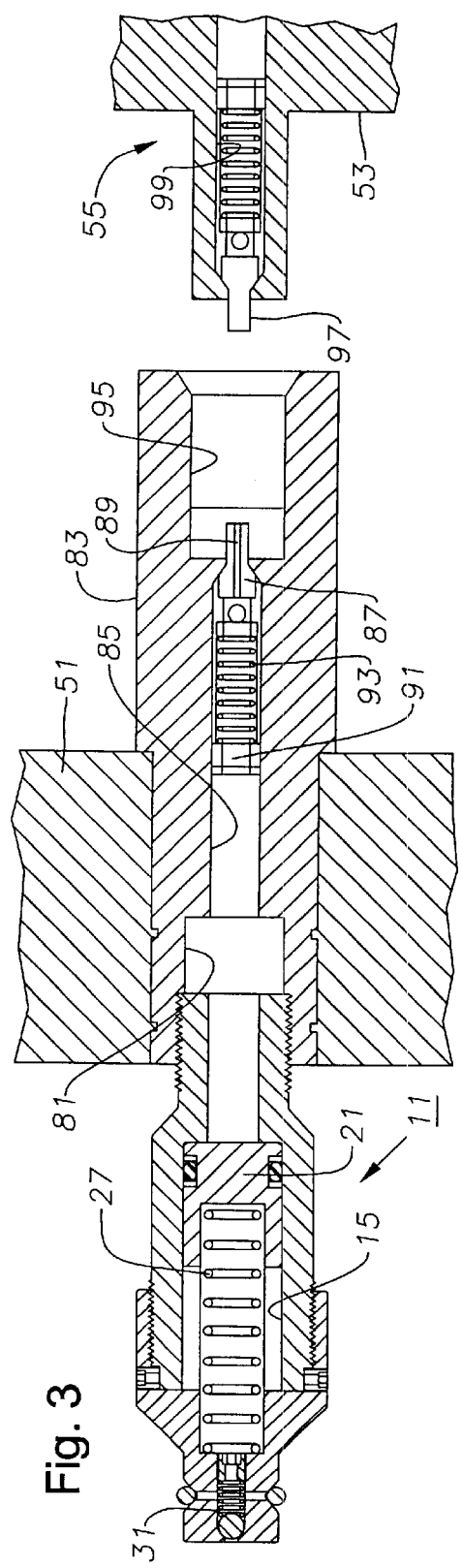

TRAPPED FLUID VOLUME COMPENSATOR FOR HYDRAULIC COUPLERS

BACKGROUND OF THE INVENTION

1. Technical Field

The present invention relates in general to an improved hydraulic coupling, and in particular to an improved hydraulic coupling that compensates for trapped fluid volume when the coupling is attached or detached.

2. Description of the Prior Art

Hydraulic couplers that are mounted to subsea equipment are provided with sealed protective covers to protect their mating components from corrosion such as calcification. During subsea installations or operations, the protective covers trap a small but significant volume of sea water after the seals of the coupler engage, but before the poppets of the coupler are opened. To complete the installation, the trapped volume of fluid must be compressed to high pressure to force the poppets to open. The pressure required is approximately 400 psi greater than the pressure by the hydraulic couplers. The trapped volume of fluid is then introduced into the hydraulic circuit. If the hydraulic circuit is blocked in any manner, the additional volume of fluid can prevent installation of the protective cover. During removal of the protective cover, the same volume of fluid is still trapped. However, during removal of the cover a vacuum is developed prior to the seals of the coupler disengaging. The vacuum pressure far exceeds the installation differential pressure of 400 psi,, since the poppets do not open in both directions (e.g., the poppets only allow fluid flow in, not out).

In the prior art, this problem is typically overcome by welding an adapter to the back side of the hydraulic coupler and attaching one end of a short section of a flexible hose to the adapter. The opposite end of the hose is capped in hope that the hose acts as a pressure compensator. Unfortunately, the hoses installed must be rated for the hydraulic system operating pressures, and usually provide an insignificant amount of accumulation. This solution is particularly unworkable in high pressure applications on the order of 15,000 psi. Moreover, as the number of couplers that are mated at one time continues to increase, so does the installation and removal forces required to manipulate their protective covers. In addition, the cost of machining the adapter, welding it to the hydraulic coupler, and then installing the hose sections along with the required fittings is disproportionately high. Thus, an improved solution for compensating for pressure and the volume of trapped fluid in a hydraulic coupling during the attachment and detachment of the protective cover is needed.

SUMMARY OF THE INVENTION

A volume compensator has a body with an axial chamber containing a piston assembly that is biased to one side by a spring. The compensator is coaxially mounted with a female coupler to a protective cover for a hydraulic interface plate. The female coupler has an axial bore containing a poppet assembly with an axial bleed port that extends into a receptacle on the end of the female coupler. The receptacle receives a male coupler on the interface plate. The male coupler contains a poppet assembly with a solid poppet that seals in high pressure hydraulic fluid.

When the cover is secured to the interface plate, the male coupler is inserted into the receptacle and a small amount of sea water is trapped in between. The trapped sea water is forced through the bleed port and female coupler, and into the compensator where it displaces the piston and spring in the compensator. When the tips of poppets engage, high pressure hydraulic fluid is released into the female coupler and compensator where it is retained. When the cover is detached from the interface plate, the tips of the poppets disengage to seal off the high pressure hydraulic fluid. As the male coupler is withdrawn from the receptacle, the spring returns the piston to its starting position and ambient sea water is drawn into the chamber in the compensator.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 1 is a sectional side view of a volume compensator constructed in accordance with the present invention as would be seen along the line 1—1 on the protective cover in FIG. 2.

FIG. 3 is a sectional side view of one volume compensator on the protective cover of FIG. 2 shown prior to engaging a hydraulic coupler.

DETAILED DESCRIPTION OF THE PREFERRED EMBODIMENT

Figure 2:
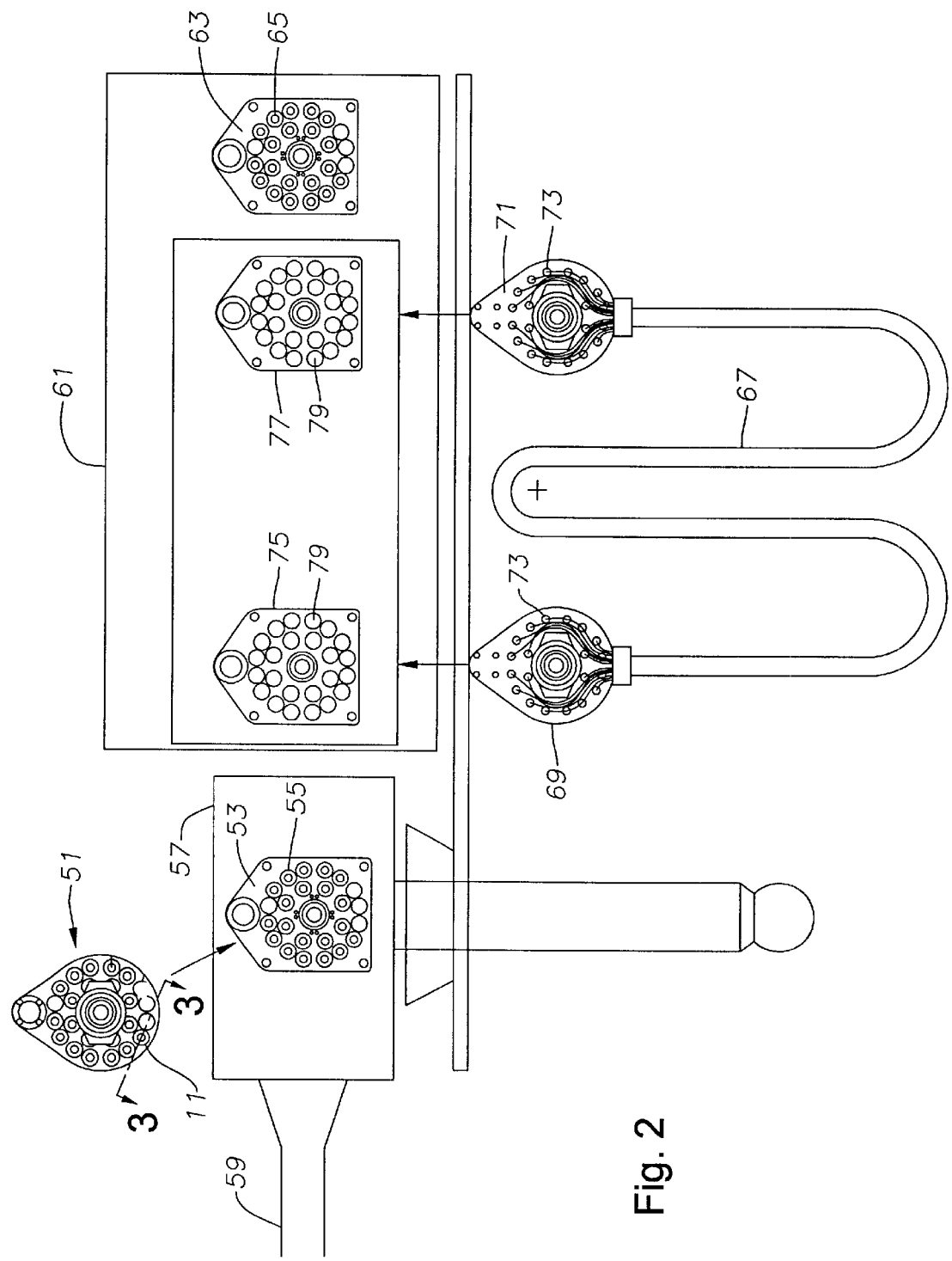
FIG. 2 is a schematic illustration of a subsea production tree and production umbilical termination assembly utilizing a protective cover equipped with the volume compensators of FIG. 1.

Referring to FIG. 1, a trapped fluid volume compensator 11 constructed in accordance with the present invention is shown. Compensator 11 has a generally tubular body 13 with an axial bore or chamber 15 and a male threaded fitting 17 on one end. In other embodiments, female threaded fittings or welded versions also may be used. A piston assembly is located within chamber 15 and includes a piston 21 having an O-ring 23 with a pair of back-up rings 25 for sealing piston 21 to chamber 15. Although shown on the left side of chamber 15, piston 21 is biased to the right side of chamber 15 by a compression spring 27.

A poppet ball assembly is located in an axial vent 31 to the left of the piston assembly. Axial vent 31 is coaxial with and smaller in diameter than chamber 15, and extends to the exterior of body 13. The poppet ball assembly includes an adjustable poppet retainer 33 that is seated in a profile in axial vent 31, a poppet ball 35, and a poppet compression spring 37 extending therebetween. Poppet ball 35 is biased to the left by spring 37 and seals against a seat in axial vent 31. A set of radial vents 39 extend from axial vent 31 to the exterior of body 13 for fluid communication therebetween. Radial vents 39 are sealed by an O-ring 41 located in an annular seat on the exterior of body 13.

Referring now to FIGS. 2 and 3, volume compensators 11 are individually mounted to couplers 83, which are mounted to a protective cover 51. Cover 51 is provided for a hydraulic interface plate 53 having a plurality of hydraulic couplers 55. In the embodiment shown, twenty compensators 11 are mounted on cover 51 in a pattern that is complementary to the pattern of twenty couplers 55 located on interface plate 53. Interface plate 53 is mounted to a production umbilical termination assembly (UTA) 57 having a production umbilical 59 containing hydraulic fluid supply lines. The UTA 57 supplies hydraulic fluid and provides surface control of a subsea production tree 61. Like UTA 57, tree 61 has a hydraulic interface plate 63 with hydraulic couplers 65 in the same complementary pattern described above.

Tree 61 also has a hydraulic jumper 67 containing hydraulic fluid supply lines that are terminated on their ends with stab plates 69, 71. Each stab plate 69, 71 has hydraulic couplers 73 in the complementary pattern that mate with couplers 55, 65 on interface plates 53, 63, respectively. When jumper 67 is not in use, stab plates 69, 71 are removably mounted to parking position plates 75, 77, respectively (configured with non-operational fittings 79 in the complementary pattern), that are located adjacent to interface plate 63 on tree 61.

Protective cover 51 is installed on UTA interface plate 53 at the surface before UTA 57 is deployed to the landing position shown, adjacent to tree 61. Stab plates 69, 71 on jumper 67 are located in their respective parking position plates 75, 77 at this time. The remaining steps are typically performed by a remotely-operated vehicle at the sea floor. Stab plate 71 is moved from parking position plate 77 to tree interface plate 63 such that couplers 73 and 65 are engaged. Cover 51 is removed from UTA interface plate 53 and secured to parking position plate 77 on tree 61. Finally, stab plate 69 is moved from parking position plate 75 to UTA interface plate 53 to complete the hydraulic connections between UTA 57 and tree 61. Jumper 67 is detached from interface plates 53, 63 by reversing this sequence of steps.

During this operational sequence, the volume compensators 11 on cover 51 provide significant benefits over prior art designs. As shown in FIG. 3, the male threaded end 17 of each compensator 11 is secured to a threaded hole 81 in a coaxial, hydraulic female coupler 83. Thus, compensator 11 extends from one side of cover 51, and female coupler 83 extends from the opposite side of cover 51. Female coupler 83 has a body with an axial bore 85 containing a poppet assembly. The poppet assembly includes a poppet 87 having an axial bleed port 89, a poppet retainer 91 mounted in bore 85, and a spring 93 therebetween for biasing poppet 87 to the right against a seat at the right end of bore 85. Bleed port 89 prevents poppet 87 from sealing the right end of bore 85.

Female coupler 83 also has a receptacle 95 located to the right of and in fluid communication with bore 85. Receptacle 95 is provided for receiving one of the conventional hydraulic male couplers 55 (FIG. 2) on UTA interface plate 53. However, when cover 51 is placed on parking position plate 77, fittings 79, which are merely rubber pads, block off receptacles 95 and are not received therein. As shown in FIG. 3, male coupler 55 contains a poppet assembly with a solid poppet 97 (i.e., no bleed port) that seals against a seat on the left end of an axial bore 99 in male coupler 55.

Figure 4:
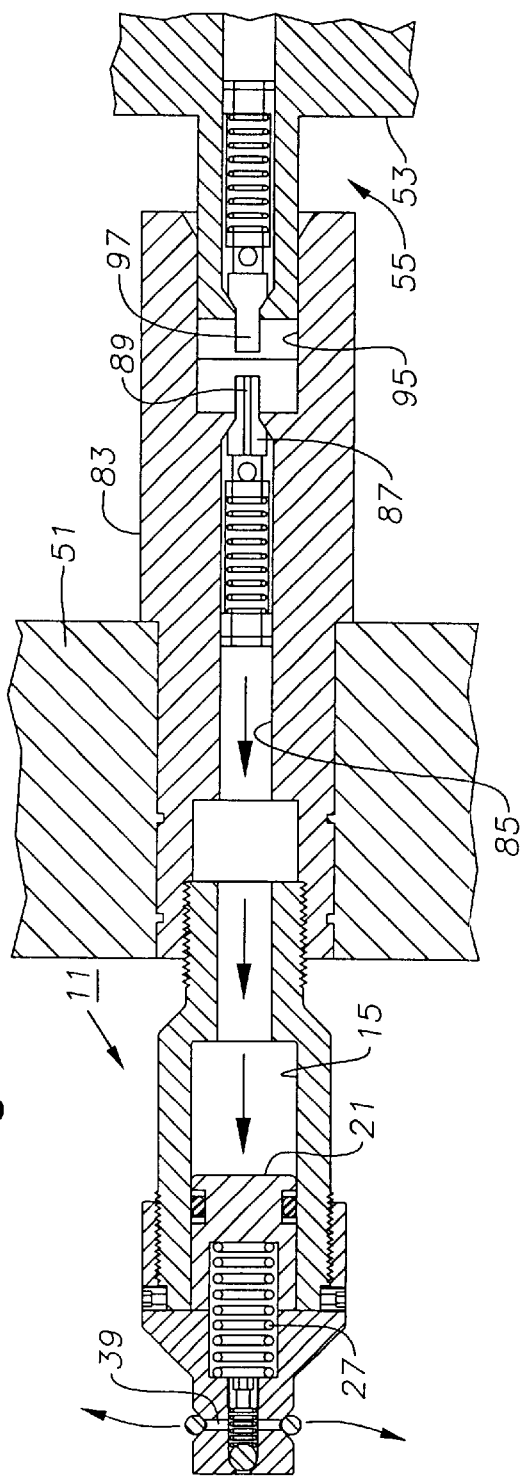
FIG. 4 is a sectional side view of the volume compensator and hydraulic coupler of FIG. 3 shown during an intermediate step of engagement.

Prior to engaging or securing cover 51 to UTA interface plate 53 or parking position plate 77 (FIG. 3), piston 21 in compensator 11 is biased and sealed to the right side of chamber 15 by spring 27 (chamber 15 contains ambient sea water), poppet 87 in female coupler 83 is biased (but not sealed) to the right by spring 93, and poppet 97 in male coupler 55 is biased and sealed to the left end of male coupler 55. Male coupler 55 is coaxially inserted into receptacle 95 in female coupler 83 (FIG. 4), and a small but significant amount of sea water is trapped therebetween. As male coupler 55 continues to the left, the trapped sea water is forced through bleed port 89 in poppet 87, through bore 85 of female coupler 83, and into compensator 11. The trapped sea water pressure acts against the right side of piston 21 and the force provided by spring 27. Since the trapped sea water pressure is greater than the force of spring 27, piston 21 moves to the left (see left side of FIG. 4), thereby displacing the ambient sea water in chamber 15 on the left side of piston 21 through radial ports 39.

Figure 5:
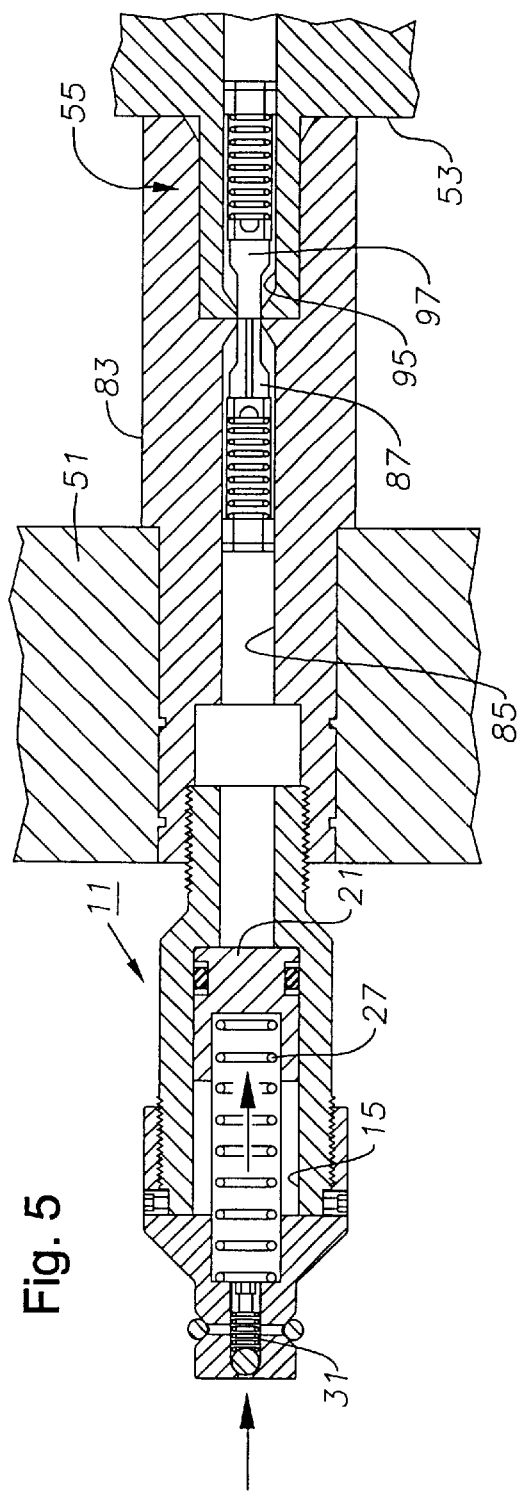
FIG. 5 is a sectional side view of the volume compensator and hydraulic coupler of FIG. 3 shown just prior to disengagement.

The tips of poppets 87, 97 eventually engage (see right side of FIG. 5) and mechanically displace each other from their respective seats in female coupler 83 and male coupler 55. Couplers 83, 55 are fully engaged when the outer rim or right end of female coupler 83 abuts the shoulder on male coupler 55. Displacing poppet 97 releases high pressure hydraulic fluid from male coupler 55 into female coupler 83 and compensator 11. Since piston 21 is located on the left side of chamber 15 (see left side of FIG. 4), the high pressure hydraulic fluid is readily contained by compensator 11.

When cover 51 is detached from UTA interface plate 53, the tips of poppets 87, 97 disengage (see right side of FIG. 4) and mechanically release each other back to their respective seats in female coupler 83 and male coupler 55, thereby sealing off the high pressure hydraulic fluid in male coupler 55. As male coupler 55 is withdrawn from receptacle 95 (see FIG. 3), piston 21 is returned to the right side of chamber 15 (see right side of FIG. 5) by spring 27, and ambient sea water is drawn into chamber 15 through axial vent 31.

The present invention has several advantages. In addition to protecting hydraulic couplers from the corrosive effects of sea water such as calcification, a protective cover equipped with volume compensators constructed in accordance with the present invention is much easier to attach and detach from a hydraulic coupler. The volume compensator provides a chamber into which the trapped sea water is displaced. It also alleviates the pressure created during installation and removal of the cover. In addition, it provides a supply of fluid to the hydraulic coupler during removal of the cover.

While the invention has been shown or described in only some of its forms, it should be apparent to those skilled in the art that it is not so limited, but is susceptible to various changes without departing from the scope of the invention.

What is claimed is:

1. A subsea hydraulic coupler for mating with a second coupler containing high pressure hydraulic fluid and having a bore sealed with a second poppet, the subsea hydraulic coupler comprising:

a body having a bore containing a first poppet and a bleed port, and a compensator having a chamber in fluid communication with the bore, a piston in the chamber, and means for biasing the piston to one side of the chamber; and wherein the body is adapted to be joined to the second coupler such that sea water is trapped therebetween and forced through the bleed port and the bore, and into the compensator such that the piston is forced to an opposite side of the chamber, thereby preventing fluid lock between the couplers, and allowing the poppets to engage to displace the second poppet, thereby releasing the high pressure hydraulic fluid for containment by the compensator.

2. The subsea hydraulic coupler of claim 1 wherein when the first coupler is removed from the second coupler, the second poppet is released, thereby resealing the high pressure hydraulic fluid in the second coupler, such that sea water is drawn into the chamber to allow the piston to return to said one side of the chamber, thereby preventing fluid lock between the couplers to allow the couplers to be withdrawn from each other.

3. The subsea hydraulic coupler of claim 1 wherein the bleed port extends through the first poppet.

4. The subsea hydraulic coupler of claim 1 wherein the compensator and both of the couplers are adapted to be coaxial.

5. The subsea hydraulic coupler of claim 1 wherein the means for biasing the piston is a spring.

6. The subsea hydraulic coupler of claim 1 wherein the compensator has one-way inlet and outlet vents for flowing sea water into and out of the chamber, respectively.

7. A subsea hydraulic coupling system, comprising in combination:

a cover;

a compensator mounted to the cover and having a body with a chamber containing sea water, a piston in the chamber, means for biasing the piston to one side of the chamber, and an ingress and an egress extending from the chamber to an exterior of the body;

a cover coupler mounted to the cover and in fluid communication with the compensator, the cover coupler having a bore with a cover poppet and a bleed port;

an interface coupler having a bore sealed with an interface poppet, the interface coupler containing high pressure hydraulic fluid; wherein when the cover coupler is joined to the interface coupler, sea water is trapped therebetween and forced through the bleed port and the cover coupler, and into the compensator such that the piston is forced to an opposite side of the chamber, thereby displacing the ambient sea water in the chamber through the egress to prevent fluid lock between the couplers, and allowing the poppets to engage and displace the interface poppet, thereby releasing the high pressure hydraulic fluid which to be contained by the compensator; and wherein when the cover coupler is removed from the interface coupler, the poppets disengage to release the interface poppet, thereby resealing the high pressure hydraulic fluid in the interface coupler, such that sea water is drawn into the chamber through the ingress to allow the piston to return to said one side of the chamber, thereby preventing fluid lock between the couplers to allow the couplers to be withdrawn from each other.

8. The subsea hydraulic coupling system of claim 7 wherein the bleed port extends through the cover poppet.

9. The subsea hydraulic coupling system of claim 7 wherein the compensator and both of the couplers are all coaxial.

10. The subsea hydraulic coupling system of claim 1 wherein the means for biasing the piston is a spring, and each of the poppets is biased by a spring.

11. A subsea hydraulic coupling system, comprising in combination:

a cover;

a compensator mounted to the cover and having a body with an axial chamber containing sea water, a piston in the chamber, a spring for biasing the piston to one side of the chamber, an inlet vent for allowing sea water into the chamber, and an outlet vent for allowing sea water out of the chamber;

a cover coupler mounted to the cover and in fluid communication with the compensator, the cover coupler having a coaxial bore with a cover poppet, and a bleed port extending through the cover poppet;

an interface coupler having a coaxial bore sealed with an interface poppet, the interface coupler containing high pressure hydraulic fluid; wherein when the cover coupler is joined to the interface coupler, sea water is trapped therebetween and forced through the bleed port and the cover coupler, and into the compensator such that the piston is forced to an opposite side of the chamber, thereby displacing the ambient sea water in the chamber through the egress to prevent fluid lock between the couplers, and allowing the poppets to engage and displace the interface poppet, thereby releasing the high pressure hydraulic fluid which to be contained by the compensator; and wherein when the cover coupler is removed from the interface coupler, the poppets disengage to release the interface poppet, thereby resealing the high pressure hydraulic fluid in the interface coupler, such that sea water is drawn into the chamber through the ingress to allow the piston to return to said one side of the chamber, thereby preventing fluid lock between the couplers to allow the couplers to be withdrawn from each other.

* * * * *